July 29, 1930.   A. A. SWICK   1,771,664
PRUNING AND TREE TOPPING SAW
Filed March 6, 1929   2 Sheets-Sheet 1

Inventor
A. A. Swick
By Clarence A. O'Brien
Attorney

July 29, 1930.   A. A. SWICK   1,771,664
PRUNING AND TREE TOPPING SAW
Filed March 6, 1929   2 Sheets-Sheet 2
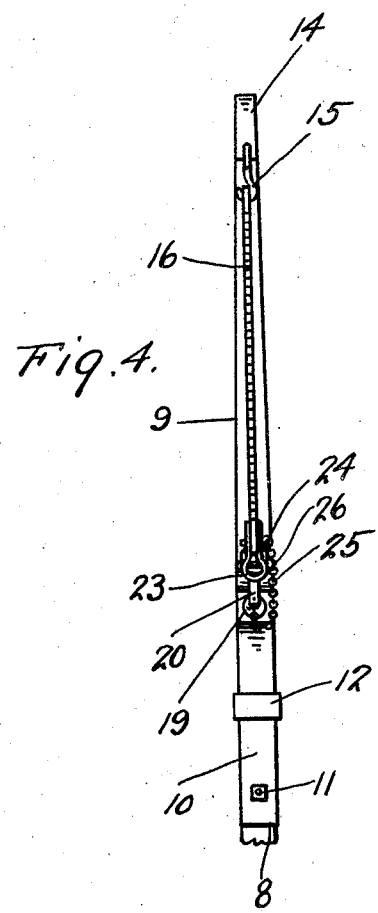
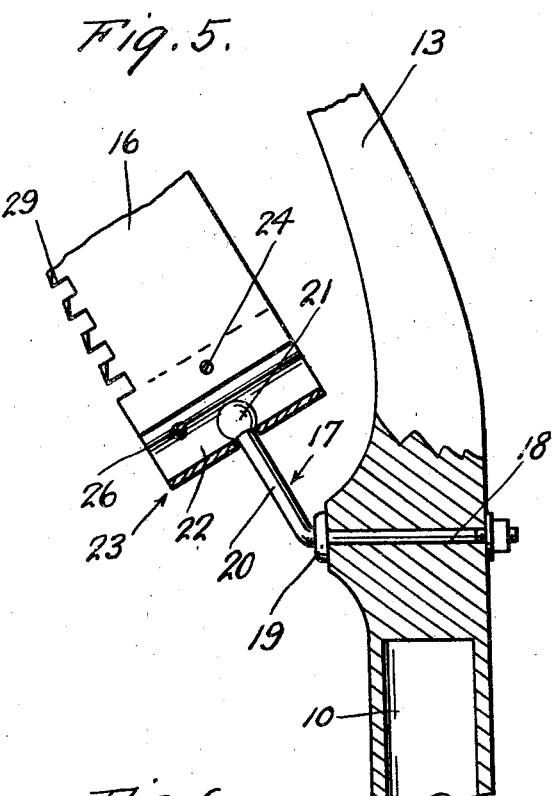
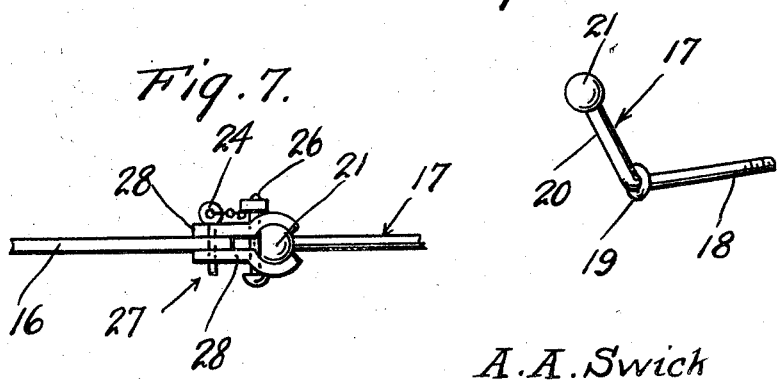
Inventor
A. A. Swick
By Clarence A. O'Brien
Attorney Patented July 29, 1930

1,771,664

UNITED STATES PATENT OFFICE

ARTHUR A. SWICK, OF CORSICANA, TEXAS

PRUNING AND TREE TOPPING SAW

Application filed March 6, 1929. Serial No. 344,709.

This invention relates to an improved pruning and tree topping saw especially adapted for horticultural use and it has particular reference to a tool of this variety which is such as to permit the saw blade as to be substantially self-adapting and adjustable, whereby to especially adapt the structure for pruning and topping work of either light or heavy character.

Stated more precisely, the invention has reference to a saw which is especially made for use on the end of an extension handle wherein the saw holder embodies a yieldable bow on which the saw blade is adjustably and detachably mounted.

In carrying out the invention, I have evolved and produced a novel structural organization of elements intimately associated in a manner to produce an efficient tool which may be expeditiously handled and easily manipulated.

An outstanding structural feature of the invention is the saw blade holder, which comprises, as before indicated, a resilient bow having a hook at its outer end for detachable connection of the adjacent end of the saw blade and provided at its inner end with a swivelled clamp, with which the adjacent end of the blade is preferably connected.

Other structural features and advantages will become more readily apparent from the following description and drawings.

In the drawings:

Figure 4 is a front edge elevation of Figure 1, looking in a direction from left to right.

Figure 5 is an enlarged fragmentary detail section and elevational view showing the swivel clamp mounting and construction.

Figure 6 is a perspective view of the especially designed bolt for connecting the swivel clamp with the stock of the blade carrier or holder.

Figure 7 is an elevational view of a slightly modified type of swivel blade clamp.

Figures 1, 2, 3:
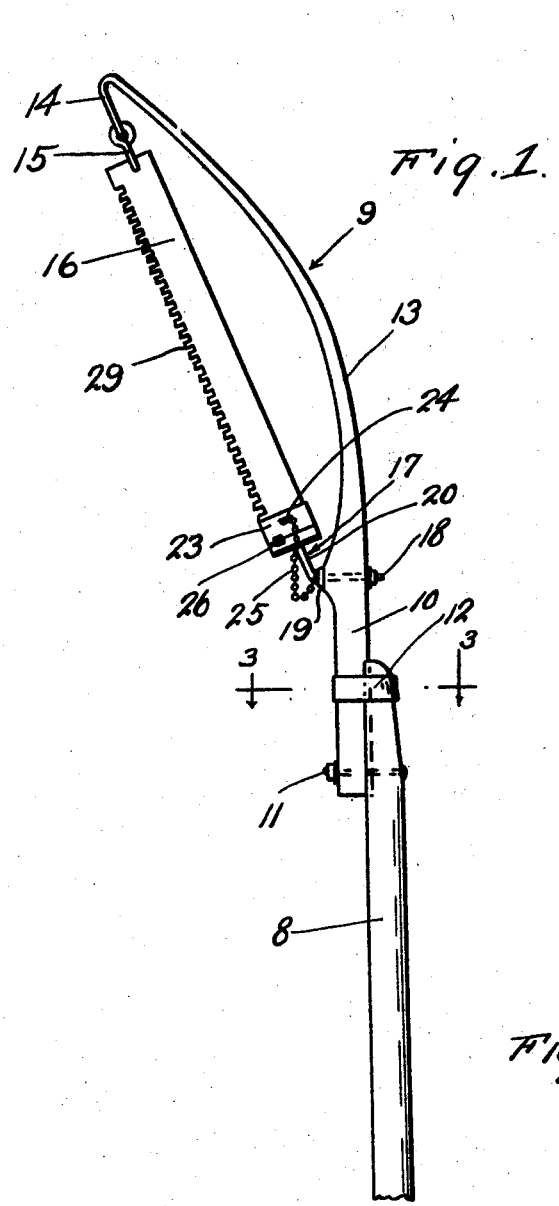
Figure 1 is a side elevational view of the complete pruning saw showing it attached to the outer end of an extension handle.
Figure 2 is an edge elevational view, looking at Figure 1, in a direction from right to left.
Figure 3 is a transverse section taken approximately upon the plane of the line 3—3 of Figure 1.

Referring now to the drawings and to Figure 1 in particular, it will be observed that 8 designates an extension handle, to the outer end of which the especially constructed pruning and tree topping saw 9 is detachably connected. The saw comprises a blade carrier including a cylindrical stock 10 bolted as at 11, to the handle 8, and securely held on the handle by an embracing band or loop 12. This holder may be made of wood or metal. It includes an outwardly tapered and longitudinally curved bow 13, terminating at its outer end in a return bend or yoke 14. Carried by the extremity of this yoke is an attaching hook 15 for the adjacent end of the saw blade 16. This allows freedom of swinging motion of the blade at this end and facilitates attachment and detachment. The opposite end of the blade is swivelly and detachably connected with the stock portion 10 of the holder.

In carrying out this end, I provide an especially constructed coupling or attaching bolt 17 of the construction seen in Figure 6. The shank 18, which is screw threaded, passes through the stock and is held in place by a retaining nut. This shank has the top flange 19 which abuts the stock. In also includes a laterally directed end portion 20, which prevents the accidental rotation of the shank in the stock and this terminates in a ball connector 24. The ball connector is swivelly connected with the bight or U-shaped portion 22, of the clamp 23. The spaced parallel sides of this clamp embrace the opposite faces of the adjacent end of the saw blade and a removable connecting and pivot pin 24 affords a suitable connection. The pin extends through the sides of the clamp and the blade as shown particularly in Figure 5. The pin is carried on a chain 25, to prevent accidental loss. In addition, a bolt 26 is provided here and acts as a stop to limit the pivotal motion of the adjacent end of the blade in one direction. This clamp and ball joined connecting device, provides a novel freely swinging swivel connection between the saw blade and the holder. The bolt 17 may be connected to the clamp 23 in the following manner. Prior to bending the clamp into its U-shape the bolt 17 may be projected therethrough, and the flange 19 may then be formed thereon, after which the clamps may be bent to its desired shape about the ball 21. Incidentally the clamp may be made as shown in Figure 7 at 27. Here it will be observed that it is composed of independent spacing plates 28. Otherwise the construction is the same.

Not only do I claim that novelty exists in this detachably and freely mounted self adapting saw and especially constructed holder, but I regard the saw blade itself as an important distinction. The back of the blade is of ordinary construction.

The toothed cutting edge, however, is especially designed. It will be observed for instance, that the teeth are widely spaced apart and each tooth is substantially rectangular in configuration. Each tooth is designated by the reference character 29. The forward corners are bevelled off diagonally as at 30, providing cutting edges which operate expeditiously and in a dependable manner. Incidentally the principal cutting action is on the drawback of the saw blade, that is, when the blade is moved in a direction toward the operator.

From the foregoing description and drawings, it will be seen that I have evolved and produced a novel flexible self-acting saw which is especially useful in horticultural work and particularly advantageous as a pruning saw or as a tree topper.

It is believed, however, that persons familiar with implements of this classification will obtain a clear understanding of the construction, operation and features of the invention after reading the description in conjunction with the drawings. Therefore a more lengthy description is regarded unnecessary.

Minor changes in shape, size and material, coming within the field of invention claimed may be resorted to, in actual practice, if desired.

I claim:

1. In a horticultural saw of the class described, a carrier bow, a bolt connected with the inner end portion of the bow having a laterally directed end portion terminating in a ball connector, and a clamp swivelly connected with said ball connector.

2. A saw of the character described comprising a resilient bow, an elongated shank extending from one end of the bow for detachable connection with a handle, means for connecting one end of a saw blade to the outer ends of the bow, and means for connecting the opposite end of the saw blade to the bow at a point adjacent the shank and including a laterally bent bolt extending transversely therethrough having a ball connection on its free end, a substantially U-shaped clamp having an opening in its connecting end for the passage of the bolt and having its closed end enlarged for the reception of the ball, the forward end of the clamp embracing the adjacent end of the saw and the detachable securing element extending therethrough for connecting the saw to the clamp.

In testimony whereof I affix my signature.

ARTHUR A. SWICK.